United States Patent
Wang (10) Patent No.: US 11,197,336 B2
(45) Date of Patent: Dec. 7, 2021

(54) COMMUNICATION DEVICE WITH TRANSPORT CONTROL PROTOCOL BUFFERS SIZED FOR DUAL CONNECTIVITY

(71) Applicant: MOTOROLA MOBILITY LLC, Chicago, IL (US)

(72) Inventor: Hui Wang, Buffalo Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 34 days.

(21) Appl. No.: 16/848,657

(22) Filed: Apr. 14, 2020

(65) Prior Publication Data

US 2021/0321475 A1    Oct. 14, 2021

(51) Int. Cl.
| | |
|---|---|
| H04W 76/16 | (2018.01) |
| H04W 72/00 | (2009.01) |
| H04W 24/08 | (2009.01) |
| H04W 80/06 | (2009.01) |

(52) U.S. Cl.
CPC ......... *H04W 76/16* (2018.02); *H04W 24/08* (2013.01); *H04W 72/005* (2013.01); *H04W 80/06* (2013.01)

(58) Field of Classification Search
CPC ... H04W 76/16; H04W 24/08; H04W 72/005; H04W 80/06
USPC ........................................................ 370/329
See application file for complete search history.

(56) References Cited

U.S. PATENT DOCUMENTS

| | | | | |
|---|---|---|---|---|
| 11,050,587 | B1 * | 6/2021 | Norbutas | H04L 12/4641 |
| 2015/0215945 | A1 * | 7/2015 | Hsu | H04W 72/0486 370/254 |
| 2015/0334737 | A1 * | 11/2015 | Susitaival | H04W 24/02 370/329 |
| 2017/0310601 | A1 * | 10/2017 | Yu | H04L 43/0817 |
| 2019/0268801 | A1 * | 8/2019 | Wang | H04L 47/30 |
| 2020/0045581 | A1 * | 2/2020 | Dong | H04W 88/16 |
| 2020/0383008 | A1 * | 12/2020 | Mallikarjunan | H04W 36/026 |

OTHER PUBLICATIONS

Merly Rojas, "Analysis of TCP performance for LTE-5G Millimeter Wave Dual Connectivity", Oct. 2019, A master thesis at UPC, 105 pages (Year: 2019).*

* cited by examiner

*Primary Examiner* — Mong-Thuy T Tran
(74) *Attorney, Agent, or Firm* — Isidore PLLC (57) ABSTRACT

A communication subsystem, method and computer program product preconfigure a size of a transport control protocol (TCP) buffer when connected to a master node using a first radio access technology (RAT) that supports during dual connectivity with a secondary node using a second RAT. A timer is started when the secondary node is available but not being used at least in part for data transfer. Until the timer expires, the TCP buffer is maintained in a size to efficiently provide both (i) support for data transfer using the first RAT via the master node only; and (ii) expedited setup of data transfer using at least the secondary node using the second RAT. When the timer expires without connecting to the secondary node, the controller reduces the size of the TCP buffer to release storage resources that are not needed for data transfer via only the master node.

20 Claims, 8 Drawing Sheets

COMMUNICATION DEVICE WITH TRANSPORT CONTROL PROTOCOL BUFFERS SIZED FOR DUAL CONNECTIVITY

TECHNICAL FIELD

The present disclosure relates generally to communication devices that transmit and receive packets of data using transport control protocol (TCP), and more particularly to communication devices supporting data transfer via TCP on two or more different radio access technologies (RAT s).

DESCRIPTION OF THE RELATED ART

Transmission Control Protocol (TCP) is a stream protocol that is one of the major protocols for the Internet. TCP is a connection oriented, reliable stream transport protocol. TCP can guarantee all data received is the same as what was sent. Communication devices that support TCP configure size of send and receive buffers. When sending data, the communication device puts data bytes into send buffers, packages the data from the buffers in segments, then transmits the segments to the destination. Another communication device that supports TCP receives the segments, places the data from the segments in receive buffers, then notifies a receiver application that handles the data from the receive buffers.

TCP flow control and congestion control are the main aspects of TCP. Flow control is a way for the receiver to govern the amount of data sent by the sender. Congestion control is intended to avoid network congestion. The window mechanism for the TCP buffer is the tool for flow control and congestion control. The receiver window is advertised by a receiver which indicates how many bytes are allowed for the sender to transmit before the sender receives another receiver window notification. The congestion window is the amount of data that the TCP sender can send. The size of the TCP windows highly impact TCP performance. For instance, the communication device normally needs a large TCP window when the data backlog results in a large delay. Generally-known communication devices control the TCP window based on default minimum and maximum TCP receive and send buffer sizes associated with each type of radio access technology (RAT).

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to aspects of the present disclosure, a communication device, a method, and a computer program product support balancing memory resources versus efficient streaming of data. In particular, a communication subsystem, managed by a controller, sizes and resizes transport control protocol (TCP) buffer(s) for different radio access technologies (RATs). In some instances, a larger TCP buffer is maintained in anticipation of switching to, or being augmented by, another RAT that uses a larger TCP buffer than a TCP buffer of a current RAT, in order to enhance efficiency. In other instances, a larger TCP buffer is reduced in size when switching to or being augmented by the other RAT is not anticipated.

In one or more embodiments, the communication device includes a memory, which contains a TCP buffer. The communication subsystem connects to an external communication system for dual connectivity in one of a first mode and a second mode. The first mode uses a first RAT for control signaling and data transfer. The second mode uses the first RAT for control signaling and uses at least a second RAT for data transfer. The first RAT requires a first size of the TCP buffer and the second RAT requires a second size of the TCP buffer that is different from the first size. The controller is communicatively coupled to the communication subsystem and the memory. In response to one of: (i) an initial connection, by the communication subsystem, to the external communication system; and (ii) and switching from the second mode to the first mode, the controller enables the communication device, via the communication subsystem, to communicate with the external communication system in the first mode. The controller starts a timer. The controller maintains the TCP buffer in the second size to provide both (i) support for data transfer using the first RAT in the first mode and (ii) expedited setup of data transfer using the second RAT in the second mode. In response to expiration of the timer, the controller reconfigures the TCP buffer to the first size to release storage resources that are not needed for data transfer in the first mode. In response to switching to the second mode before the timer expires, the controller cancels the timer.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

Figure 1:
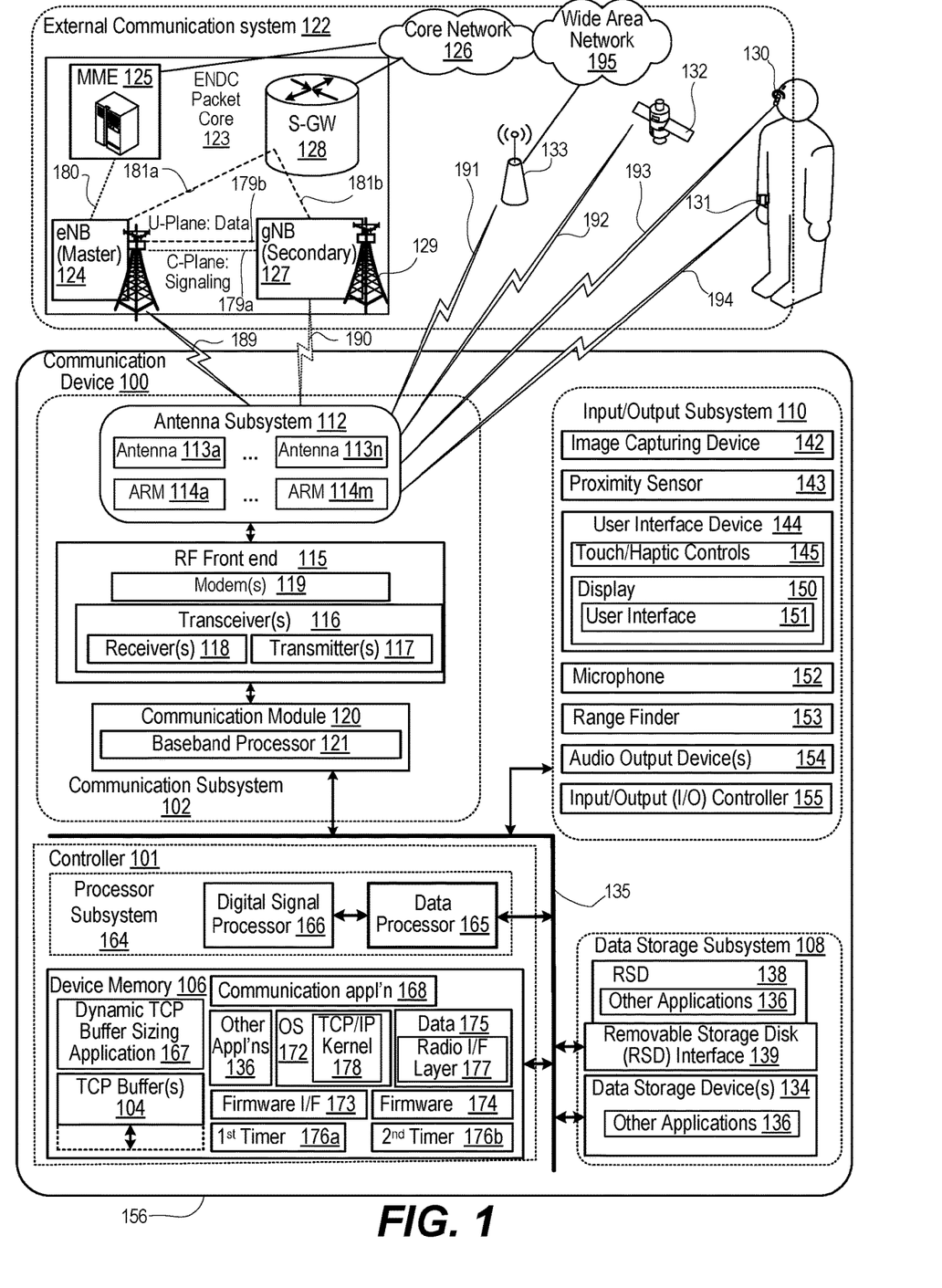
FIG. 1 illustrates a functional block diagram of a communication device that dynamically sizes transport control protocol (TCP) buffer(s) for dual connectivity to different radio access technologies (RATs), according to one or more embodiments.

FIG. 1 is a functional block diagram of an electronic device in an operating environment within which the features of the present disclosure are advantageously implemented. In particular, communication device 100, managed by controller 101, is an example of an electronic device having communication subsystem 102 that communicates with more than one RAT using TCP for data streaming. According to one aspect of the disclosure, TCP buffer(s) 104 stored in device memory 106 are dynamically sized to efficiently support dual RAT connectivity operation. Communication device 100 can be one of a host of different types of devices, including but not limited to, a mobile cellular phone, satellite phone, or smart-phone, a laptop, a net-book, an ultra-book, a networked smart watch or networked sports/ exercise watch, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In one or more embodiments, communication device 100 includes over-the-air (OTA) or wireless communication subsystem 102, data storage subsystem 108, and input/output subsystem 110, with each subsystem being managed by controller 101. Antenna subsystem 112 of wireless communication subsystem 102 includes antennas 113a-113n, and antenna array modules (ARMs) 114a-114m. In one or more embodiments, antennas 113a-113n support lower frequency bands such as ultra-high band (UHB). ARMs 114a-114m support multiple input multiple output (MIMO) communication in higher frequency bands, such as millimeter Wave (mm-Wave). Wireless communication subsystem 102 includes RF front end 115 having transceiver(s) 116 that includes transmitter(s) 117 and receiver(s) 118. RF front end 115 further includes modem(s) 119. Wireless communication subsystem 102 includes communication module 120 having baseband processor 121. Baseband processor 121 communicates with controller 101 and RF front end 115. As described in more detail below, wireless communication subsystem 102 communicates with external communication system 122.

External communication system 122 includes ENDC packet core 123 that supports TCP data streaming services for communication device 100 via public land mobile networks (PLMNs). Communication device 100 connects wirelessly or OTA to LTE evolved base node (eNB) 124, which serves as the master node for control signaling and in some instances data transfer. eNB 124 is supported by mobility management entity (MME) 125 for control services such as authentication, connection handoffs, idle mode mobility, etc. MME 125 is a control interface to core network 126. When available and needed, communication device 100 connects wirelessly or OTA with 5G base node (gNB) 127 as the secondary node for data transfer. Control plane (C-plane) signaling occurs between communication device 100, eNB 124, MME 125, and gNB 127. User plane (U-plane) data transfer can occur between communication device 100, eNB 124, gNB 127, and serving gateway (S-GW) 128 of ENDC packet core 123. eNB 124 and gNB 127 can be accessed via radio tower(s) 129.

In other applications, external communication system 122 can include devices such as wireless headset 130 and smart watch 131. External communication system 122 can also include global positioning system (GPS) satellites 132. External communication system 122 can further include access nodes 133 for wireless communication.

Data storage subsystem 108 of communication device 100 includes data storage device(s) 134. Controller 101 is communicatively connected, via system interlink 135, to data storage device(s) 134. Data storage subsystem 108 provides nonvolatile storage that is accessible by controller 101. For example, data storage subsystem 108 can provide a large selection of other applications 136 that can be loaded into device memory 106. In one or more embodiments, data storage device(s) 134 includes hard disk drives (HDDs), optical disk drives, solid state drives (SSDs), etc. Data storage subsystem 108 of communication device 100 can include removable storage device(s) (RSD(s)) 138, which is received in RSD interface 139. Controller 101 is communicatively connected to RSD 138, via system interlink 135 and RSD interface (I/F) 139. In one or more embodiments, RSD 138 is a non-transitory computer program product or computer readable storage device. Controller 101 can access RSD 138 to provision communication device 100 with program code such as other applications 136. When executed by controller 101, the program code causes or configures communication device 100 to provide the functionality described herein.

I/O subsystem 110 includes image capturing device 142, and proximity sensor 143. I/O subsystem 110 also includes user interface device(s) 144 having touch/haptic controls 145 and display 150. Display 150 presents user interface 151. I/O subsystem 110 also includes microphone 152, range finder 153, and audio output device(s) 154. I/O subsystem 110 also includes I/O controller 155, which connects to peripheral devices external to housing 156 of communication device 100.

Controller 101 controls the various functions and/or operations of communication device 100. These functions and/or operations include, but are not limited to including, application data processing, communication with other electronic devices, navigation tasks, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 101 includes processor subsystem 164, which includes one or more central processing units (CPUs), depicted as data processor 165. Processor subsystem 164 can include one or more digital signal processors 166 that are integrated with data processor 165 or are communicatively coupled to data processor 165. Data processor 165 is communicatively coupled, via system interlink 135, to device memory 106.

Device memory 106 includes applications such as dynamic TCP buffer sizing (DTBS) application 167, communication application 168, and other application(s) 136. Device memory 106 further includes operating system (OS) 172, firmware interface 173, such as basic input/output system (BIOS) or Uniform Extensible Firmware Interface (UEFI), and firmware 174. Device memory 106 includes data 175 used by communication application 168 and other application(s) 136. Device memory 106 includes first and second timers 176a-176b used by DTBS application 167. Data 175 includes radio interface layer 177 used by communication application 168. OS 172 includes TCP/IP kernel 178 that supports TCP data streaming. Processor subsystem 164 of controller 101 executes program code to provide operating functionality of communication device 100. These software and/or firmware modules have varying functionality when their corresponding program code is executed by processor subsystem 164 or secondary processing devices within communication device 100. Processor subsystem 164 of controller 101 can execute program code of communication application 168 to communicate with ENDO packet core 123.

In one or more embodiments, controller 101 of communication device 100 is communicatively coupled via system interlink 135 to wireless communication subsystem 102, data storage subsystem 108, and input/output subsystem 110. System interlink 135 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 135) are illustrated in FIG. 1, it is to be understood that more, fewer, or different interconnections may be present in other embodiments.

ENDC packet core 123 of external communication system 122 has internal communication channels. eNB 124 communicates via a wired or wireless channel 179a with gNB 127 for C-plane signaling. eNB 124 communicates via a wired or wireless channel 179b with gNB 127 for U-plane data transfer. eNB 124 communicates via a wired or wireless channel 180 with MME 125 for C-plane signaling. eNB 124 communicates via a wired or wireless channel 181a with S-GW 128 for U-plane data transfer. gNB 127 communicates via a wired or wireless channel 181b with S-GW 128 for U-plane data transfer. Communication module 120 communicates with eNB 124 via uplink/downlink channels 189. Communication module 120 communicates with gNB 127 via uplink/downlink channels 190. Communication module 120 communicates with access node 133 via transmit/receive signals 191. Communication module 120 receives satellite broadcast signals 192 from GPS satellites 132. Communication module 120 communicates with wireless headset 130 via transmit/receive signals 193. Communication module 120 communicates with smart watch 131 via transmit/receive signals 194. Communication module 120 of wireless communication subsystem 102 operates in baseband frequency range to encode data for transmission and decode received data, according to a communication protocol. Modem(s) 119 modulate baseband encoded data from communication module 120 onto a carrier signal to provide a transmit signal that is amplified by transmitter(s) 117. Modem(s) 119 demodulates the received signal from eNB 124, gNB 127 or the received signal from access node 133. The received signal is detected by antenna subsystem 112. The received signal is amplified and filtered by receiver(s) 118, which demodulate received encoded data from a received carrier signal.

In one or more embodiments, controller 101, via wireless communication subsystem 102, performs multiple types of OTA or wireless communication with external communication system 122. Wireless communication subsystem 102 can communicate via Bluetooth connection with one or more personal access network (PAN) devices, such as wireless headset 130 and smart watch 133. Communication via Bluetooth connection includes both transmission and reception via a Bluetooth transceiver device. In one or more embodiments, wireless communication subsystem 102 communicates with one or more locally networked devices via a wireless local area network (WLAN) link provided by access node 133. In one or more embodiments, access node 133 supports communication using one or more IEEE 802.11 WLAN protocols. Access node 133 is connected to wide area network 195, such as the Internet. In one or more embodiments, wireless communication subsystem 102 communicates with GPS satellites 132 to obtain geospatial location information.

The present disclosure recognizes that TCP buffer sizing is very important for efficient data transfer by communication devices, especially those that are mobile. Controller 101 can adjust TCP buffer sizing in response to differing data transfer needs of communication device 100. Controller 101 can also adjust TCP buffer sizing in response to different capabilities of cellular services and availability of cellular services provided to communication device 100 by ENDC packet core 123. While a user of communication device is mobile, communication device 100 can go through coverage areas of different RATs. Depending on the number of other communication devices seeking service, different RATs can be available in overlapping coverage areas. In addition, data transfer needs for communication device 100 can change. For example, communication device 100 can have a requirement for low latency and high data rates that are supported by a particular RAT, such as via gNB 127, or by aggregation of service via two RATs, such as via both eNB 124 and gNB 127. Based on the inherit latency and throughput of the particular one or more RATs being used, controller 101 of communication device 100 dynamically sizes TCP buffer(s) 104. The sizing can in part provide sufficient buffer to avoid communication congestion. The sizing can in part be based on prudent use of memory resources that are needed by other components and functions of communication device 100. TCP buffer sizes are updated dynamically to adapt to the network. Otherwise, improperly sized TCP buffering may lead to bad TCP performance.

In the recent past, cellular data service has been provided in part by a third generation (3G) RAT referred to as Universal Mobile Telecommunications Service (UMTS). Fourth generation (4G) RAT of evolved UTMS radio access (E-UTRA), referred to a Long Term Evolved (LTE), has largely replaced 3G UMTS for broadband, packet-based transmission of text, digitized voice, video, and multimedia. A fifth generation (5G) RAT, referred to as fifth generation new radio (5G NR), is being deployed to at least augment capabilities of 4G LTE with a yet higher capability of data transfer.

5G non-standalone (NSA) mode is an option for 5G NR deployment. NSA mode is also referred to as evolved UTMS radio access network and new radio dual connectivity (ENDC). Unlike previously deployed RATs, ENDC actually utilizes two types of RATs at the same time. The 5G NSA mode depends on the control plane of an existing LTE network for connectivity control signaling. LTE network can also be the sole RAT in 5G NSA mode that provides data transfer service. Alternatively, the LTE network (e.g., eNB 124) can signal for augmentation by, or sole reliance on, 5G NR (e.g., gNB 127) for data transfer services. In one or more embodiments, eNB 124 is the master node and gNB 127 is the secondary node. Communication devices 100 may remain connected to both 4G LTE and 5G NR or remain connected to just 4G LTE. The present disclosure addresses the increased complexity of TCP buffer size configuration for more efficient use of memory resources while avoiding congestion during transfer of a stream of packet data.

In one or more embodiments, first and second timers 176a-176b can have durations that are static. In one or more embodiments, first and second timers 176a-176b have durations that are the same. In one or more embodiments, first and second timers 176a-176b have durations that are different values such as first timer 176a being longer than second timer 176b. In one or more embodiments, first and second timers 176a-176b have respective durations that are dynamically adjusted based on current conditions. Factors that adjust first and second timers 176a-176b include but are not limited to: (i) whether user interface device(s) 144 are on or off; (ii) whether receive or transmit data packets are scheduled for transfer and the amount that are scheduled; and (iii) whether history data indicates a likelihood that a 5G NR physical channel will be allocated. When user interface device(s) 144 are off, one or both of first and second timers 176a-176b can be set longer than when user interface device(s) 144 are on. One or both of first and second timers 176a-176b can be extended based on the presence or the amount of receive or transmit data packages scheduled for transfer. The history data may include collected information about an amount of time experienced from a 5G available state to a 5G connected state, an amount of time experienced in a 5G temporarily disconnected state, and cell location information, etc. The duration of one or both of first and second timers 176a-176b can be periodically updated by data aggregation or machine learning.

The present disclosure addresses an illustrative application for ENDC cases. Aspects of the present disclosure can also apply to any dual or multiple connectivity cases in the future for various kinds of RATs. Generally, a master node provides master connectivity with one or more secondary nodes providing secondary connectivity. The secondary connectivity augments or replaces data transfer via the master node.

Figure 2A:
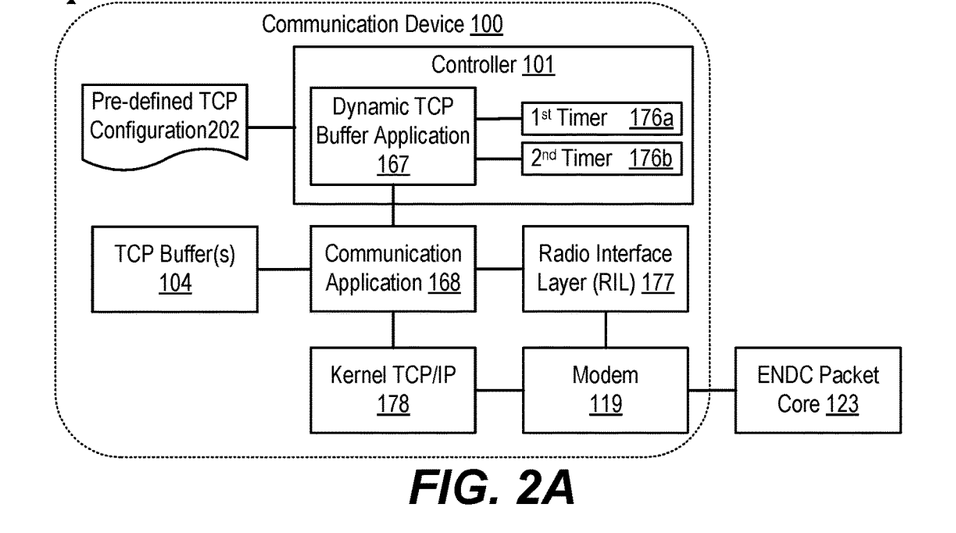
FIG. 2A depicts a communication diagram between the communication device an external communication network of FIG. 1 for dynamically configuring the TCP buffer(s), according to one or more embodiments.

FIG. 2A depicts a communication diagram 200 for controller 101 that configures sizing of TCP buffer(s) 104 to support data transfer between communication device 100 and ENDC packet core 123. Communication device 100 can contain pre-defined TCP configuration data 202 that provides default sizing for TCP buffer(s) 104 based on type of RAT. Types of RATs include, but are not limited to: second generation (2G) global system for mobile communications (GSM), 2G code division multiple access (CDMA); 3G UMTS; 3G wideband code division multiple access (WCDMA); 4G LTE; and 5G NR. The values of the default sizing are pre-defined for each RAT type according to their typical throughput and latency. Normally, modem 119 or baseband processor 121 (FIG. 1) manages the radio functions, communicates to ENDC packet core 123, and reports changes in RAT. DTBS application 167 via OS 172 (FIG. 1) adjusts the pre-defined configuration to apply the corresponding TCP buffer sizes in response to changes in RAT. DTBS application 167 manages the resizing of TCP buffers by starting first and second timers 176a-176b. By use of first and second timers 176a-176b, DTBS application 167 prepares TCP buffer(s) 104 for a change from a lower performing RAT to a higher performing RAT so that radio interface layer 177 operates without communication congestion.

ENDC packet core 123 supports dual connectivity. In the illustrated embodiment, eNB 124 (FIG. 1) that uses LTE RAT is attached as the master cell. gNB 127 (FIG. 1) that uses 5G NR RAT is the secondary cell. gNB 127 (FIG. 1) may not be connected to communication device 100 until sending data packets to, or receiving data packets from, communication device 100. Furthermore, when communication device 100 is idle, gNB 127 may be frequently disconnected for a short period in order to conserve network resources, respond to limitations in coverage, or conserve power. Pre-defined TCP configuration data 202 is insufficient for these dynamic changes in RATs. eNB 124 disconnects communication device 100 from gNB 127 (FIG. 1) when data transfer requirements do not warrant connection to 5G NR. When a requirement for data transfer subsequently arises that would benefit from 5G NR, eNB 124 begins data transfer with communication device 100 and initiates connection of communication device 100 to gNB 127. Thus, the data transfer begins via eNB 124 (FIG. 1) before connection to gNB 127 (FIG. 1) for augmentation or replacement by 5G NR is completed. The generally-known size configuration of TCP buffers occurs after data transfer begins. Thus, the 5G TCP buffer size may not apply to the early packets, especially for the initial window sizes. Thus, data congestion can occur. Alternatively, TCP buffer sizes may be updated frequently due to the short 5G disconnected state. Both of these situations impact TCP performance for 5G. First, communication device 100 sizes TCP buffer(s) 104 for 5G NR before connecting to gNB 127 (FIG. 1) for data transfer using 5G NR. In one or more embodiments, communication device 100 maintains this preparatory sizing of TCP buffer(s) 104 for the duration of first timer 176a. If data transfer begin during the duration of timer 176a, initial data packets are properly buffered even before connection to gNB 127 is completed. Second, communication device 100 retains size of TCP buffer(s) 104 a little longer after disconnecting from 5G NR. Maintaining the configuration based on a duration of second timer 176b avoids the processing overhead of frequently updating TCP buffer sizes. Due to sporadic data transfer needs or limited connection availability, 5G physical channel can be lost and regained again in a short time. Controller 101 starts first timer 176a when: (i) eNB 124 (LTE) is attached; and (ii) ENDC operation is available (i.e., gNB 127 (FIG. 1)) is available. Controller 101 determines that gNB 127 (FIG. 1) is available for dual connectivity based on receiving a broadcast from eNB 124 (FIG. 1). In one or more embodiments, the broadcast includes a PLMN information list that is compliant with 3GPP release 15. The PLMN information lists can indicate that gNB 127 is available for ENDC operation with communication device 100. In one or more embodiments, the eNB 124 (FIG. 1) indicates that ENDC operation is not being restricted. In one or more embodiments, communication device 100 relies upon information received from eNB 124 (FIG. 1) to connect to gNB 127 (FIG. 1). With these embodiments, communication device 100 does not scan for a broadcast from gNB 127 (FIG. 1) to confirm availability. In one or more alternate embodiments, communication device 100 uses information received from eNB 124 (FIG. 1) to scan for broadcasts by gNB 127 (FIG. 1) to confirm availability.

Figure 2B:
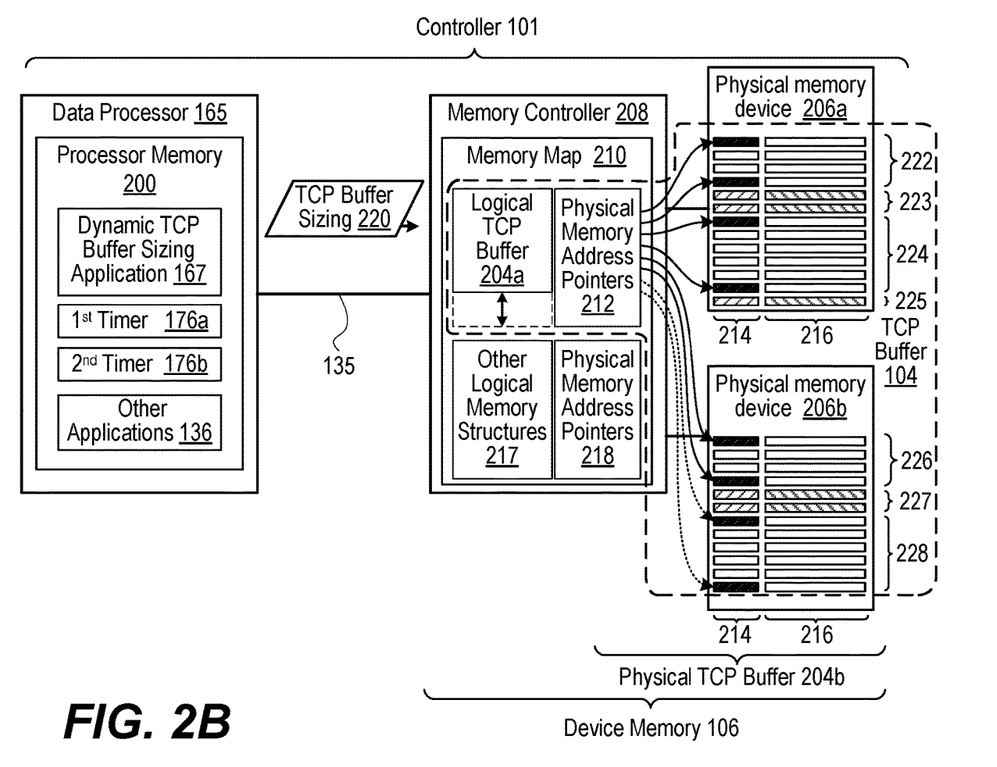
FIG. 2B depicts an internal communication diagram of the controller of FIG. 1 that dynamically configures TCP buffer(s), according to one or more embodiments.

FIG. 2B depicts an internal communication diagram of controller 101 that dynamically configures TCP buffers 104. In one or more embodiments, dynamic TCP buffer sizing application 167 and other applications 136 are loaded into processor memory 201 of data processor 165 for execution. Dynamic TCP buffer sizing application 167 creates first and second timers 176a-176b in processor memory 201. Other data structures such as TCP buffers 104 are created in other portions of device memory 106. For clarity, one TCP buffer 104 is depicted, such as for buffering data that is received or that is buffered prior to transmitting. TCP buffer 104 includes logical TCP buffer 204a that is accessed by dynamic TCP buffer sizing application 167. Abstracting logical TCP buffer 204a from physical TCP buffer 204b stored in physical memory devices 206a-206b simplifies design of dynamic TCP buffer sizing application 167, which can be hosted on different configurations of controller 101. Other applications 136 can similarly access other logical memory structures 217 that are supported by physical memory devices 206a-206b. Data processor 165 is communicatively coupled to memory controller 208 via system interlink 135. Memory controller 208 manages memory map 210 that links physical memory address pointers 212 associated with logical TCP buffer 204 to memory addresses 214 of data memory 216 respectively contained in physical memory devices 206a-206b. Memory controller 208 also manages memory map 210 that links physical memory address pointers 218 associated with other logical memory structures 217.

Controller 101 resizes TCP buffer 104. In one or more embodiments, dynamic TCP buffer sizing application 167 transmits TCP buffer sizing message 220 to memory controller 220. Memory controller 208 allocates a corresponding amount of data memory 216 in physical memory devices 206a-206b. Dynamic TCP buffer sizing application 167 can request read/write access to particular locations in a continuously defined amount of virtual memory in logical TCP buffer 204a that is dynamically mapped to one or more portions 222-226 of data memory 216. For example, TCP buffer 104 can initially be sized for operating in the second mode for 5G NR. Memory controller 208 assigns portions 222, 224, 226, and 228. Later, TCP buffer 104 is resized for operating only in LTE. In response, memory controller 208 releases portions 224 and 228.

Figure 3:
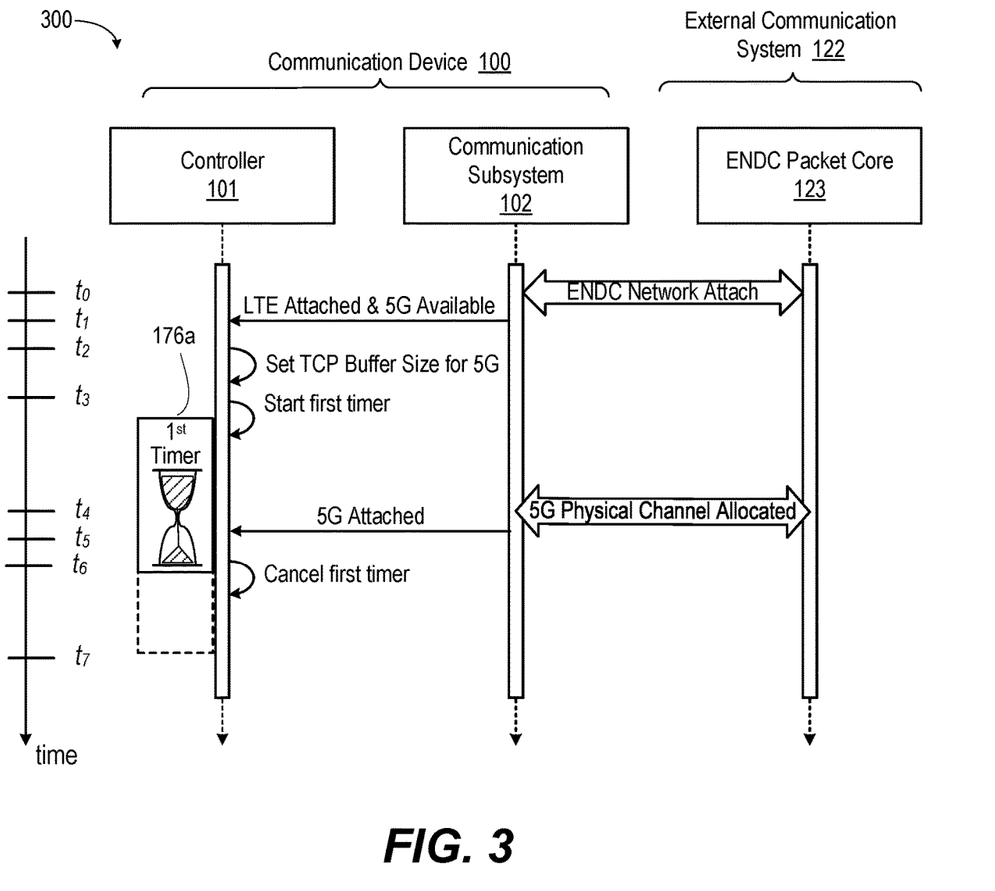
FIG. 3 depicts a timing diagram of communication between the communication device and an external communication network of FIG. 1 for preconfiguring TCP buffer(s) for an available but unattached RAT, according to one or more embodiments.

FIG. 3 depicts a timing diagram 300 of communication between controller 101 and communication subsystem 102 within communication device 100. Timing diagram 300 also depicts communication between communication subsystem 102 and ENDC packet core of external communication subsystem 122. The communication results in controller 101 preconfiguring the TCP buffer(s) for an available but unattached RAT, based on a first timer. At time $t_0$, communication subsystem 102 connects or attaches to ENDC packet core 123. At time $t_1$, communication subsystem 102 reports to controller 101 that communication subsystem 102 is connected to ENDC packet core 123 in LTE RAT and that 5G NR RAT is available. At time $t_2$, controller 101 sizes TCP buffer(s) 104 (FIG. 1) for 5G NR. At time $t_3$, controller 101 starts first timer 176a. First timer 176a has a first duration that is scheduled to expire at time $t_7$. However, at time $t_4$, communication subsystem 102 is allocated 5G physical channel by ENDC packet core 123. Communication subsystem 102 is already supported by TCP buffer(s) 104 (FIG. 1) sized for 5G NR. At time $t_5$, communication subsystem 102 reports to controller 101 that communication subsystem 102 is connected to ENDC packet core 123 in 5G NR RAT to augment or replace LTE physical channel allocation. At time $t_6$, controller 101 cancels first timer 176a, enabling TCP buffer(s) 104 (FIG. 1) to remain sized for 5G NR.

Figure 4:
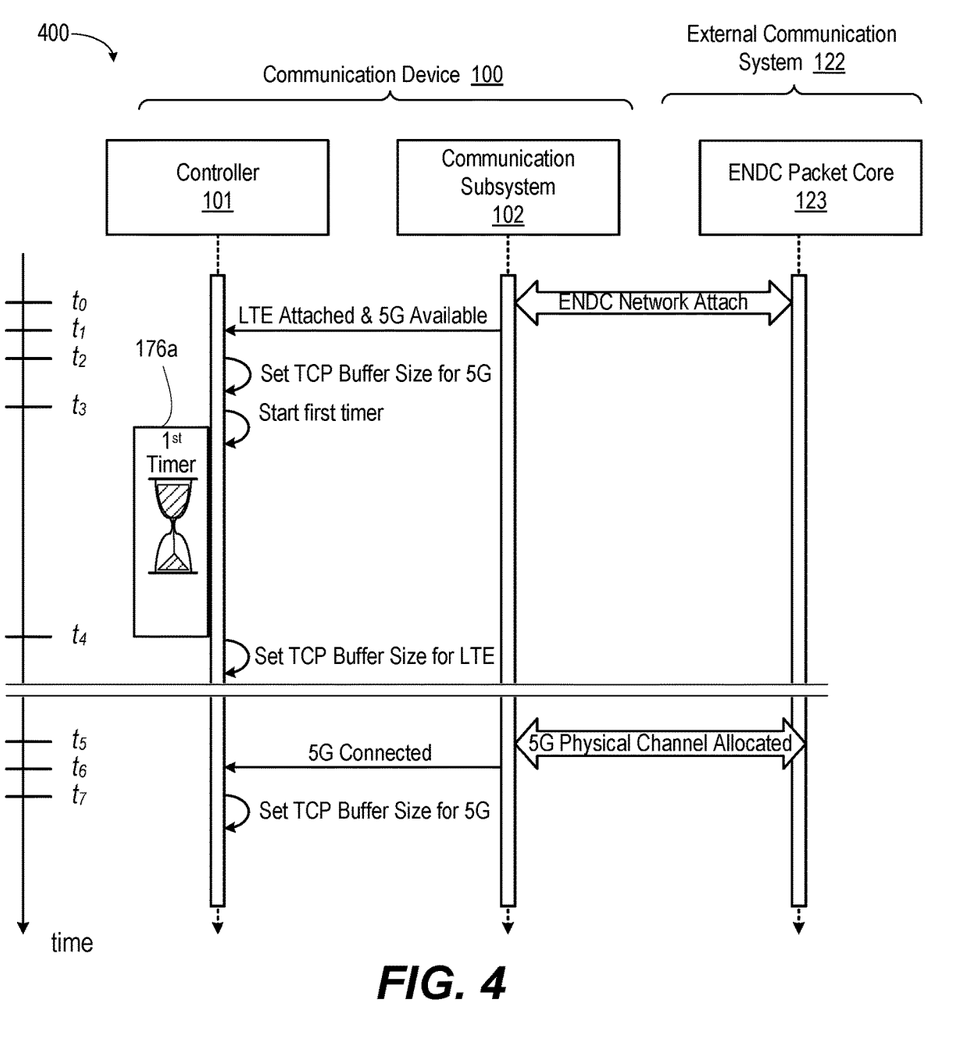
FIG. 4 depicts a timing diagram of communication between the communication device and an external communication network of FIG. 1 for downsizing one or more preconfigured TCP buffer(s) in response to an expired first timer, according to one or more embodiments.

FIG. 4 depicts a timing diagram 400 of communication between controller 101 and communication subsystem 102 within communication device 100 and with ENDC packet core 123 of external communication subsystem 122. The communication results in downsizing the TCP buffer(s) to release resources in response to an expired first timer. At time to, communication subsystem 102 attaches to ENDC packet core 123. At time $t_1$, communication subsystem 102 reports to controller 101 that communication subsystem 102 is connected to ENDC packet core 123 in LTE RAT and that 5G NR RAT is available. At time $t_2$, controller 101 sizes TCP buffer(s) 104 (FIG. 1) for 5G NR. At time $t_3$, controller 101 starts first timer 176a. At time t₄, in response to first timer 176a expiring, controller 101 sets TCP buffer(s) to a size appropriate for LTE, which is smaller than 5G NR. The additional memory resources are made available for other processes and uses during an interval of time in which 5G NR is anticipated to be unavailable or unnecessary. At time t₅, communication subsystem 102 is allocated a 5G physical channel by ENDC packet core 123. At time t₆, communication subsystem 102 reports to controller 101 that communication subsystem 102 is connected to ENDC packet core 123 in 5G NR RAT to augment or replace LTE physical channel allocation. At time t₇, controller 101 configures size of TCP buffer(s) 104 (FIG. 1) for 5G NR.

Figure 5:
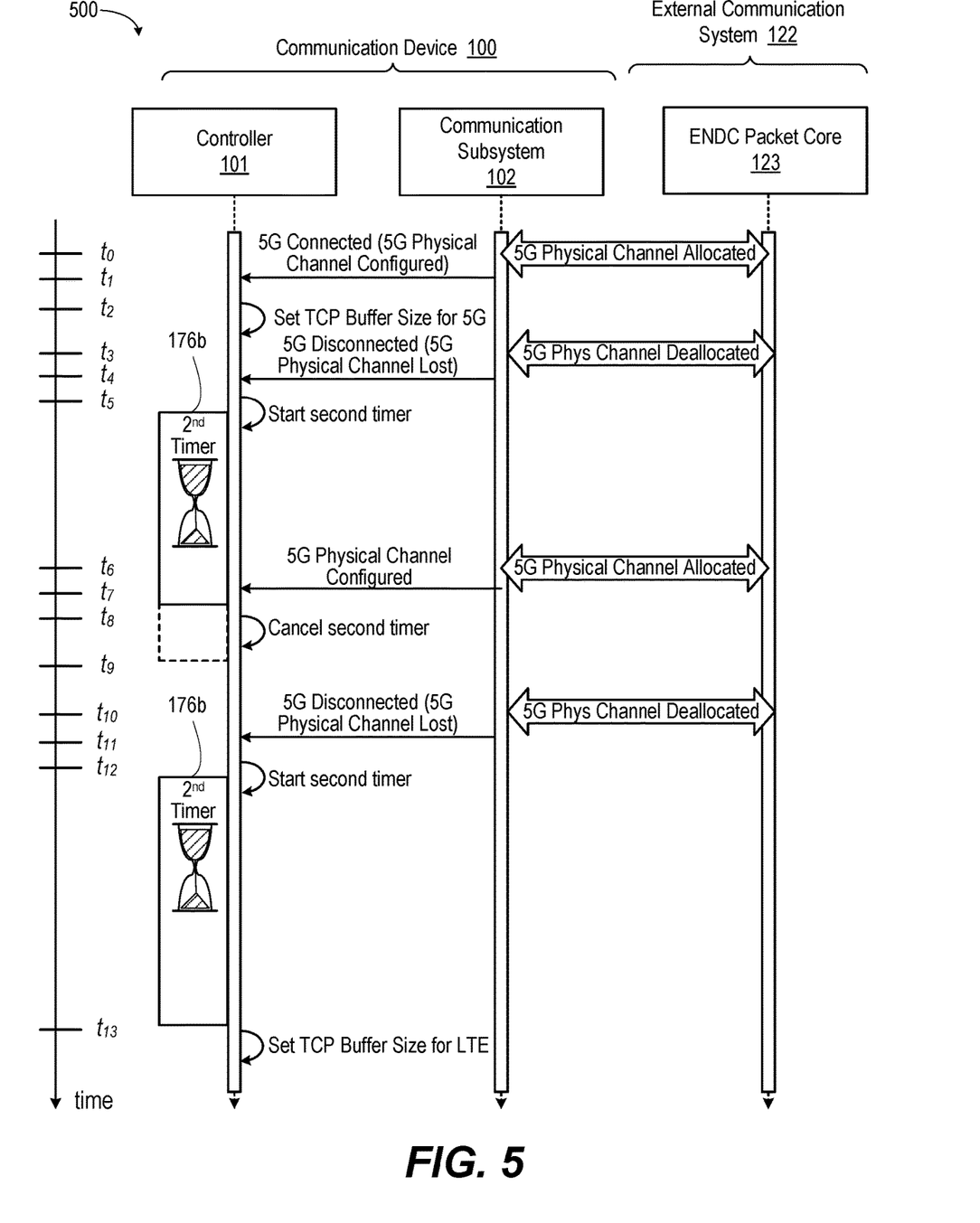
FIG. 5 depicts a timing diagram of communication between the communication device and an external communication network of FIG. 1 for maintaining a size of TCP buffer(s) after changing RATs, according to one or more embodiments.

FIG. 5 depicts a timing diagram 500 of communication between controller 101 and communication subsystem 102 both of communication device 100 and with ENDC packet core 123 of external communication subsystem 122. The communication results in maintaining the size of the TCP buffer(s) based on a second timer after changing RATs from 5G NR to 4G LTE. At time to, communication subsystem 102 is allocated a 5G physical channel by ENDC packet core 123. At time t₁, communication subsystem 102 reports to controller 101 that communication subsystem 102 is connected to ENDC packet core 123 in 5G NR RAT. At time t₂, controller 101 sizes TCP buffer(s) 104 (FIG. 1) for 5G NR. At time t₃, communication subsystem 102 determines that allocation of a 5G physical channel by ENDC packet core 123 is lost. At time t₄, communication subsystem 102 reports to controller 101 that communication subsystem 102 is connected to ENDC packet core 123 in LTE RAT and that allocation of physical channel for 5G NR RAT is lost. At time t₅, controller 101 starts second timer 176b having a second duration that is scheduled to expire at time t₉. However, at time t₆, communication subsystem 102 is allocated with 5G physical channel by ENDC packet core 123. At time t₇, communication subsystem 102 reports to controller 101 that communication subsystem 102 is connected to ENDC packet core 123 in 5G NR RAT to augment or replace LTE physical channel allocation. At time t₈, controller 101 cancels second timer 176b. TCP buffer(s) 104 (FIG. 1) is preconfigured for 5G NR.

At time t₁₀, communication subsystem 102 determines that allocation of a 5G physical channel by ENDC packet core 123 is lost. At time t₁₁, communication subsystem 102 reports to controller 101 that communication subsystem 102 is connected to ENDC packet core 123 in LTE RAT and that allocation of physical channel for 5G NR RAT is lost. At time t₁₂, controller 101 starts second timer 176b having a second duration that is scheduled to expire at time t₁₃. At time t₁₃, controller 101 downsizes TCP buffer(s) 104 (FIG. 1), releasing memory resources, in response to second timer 176b expiring.

Figure 6A:
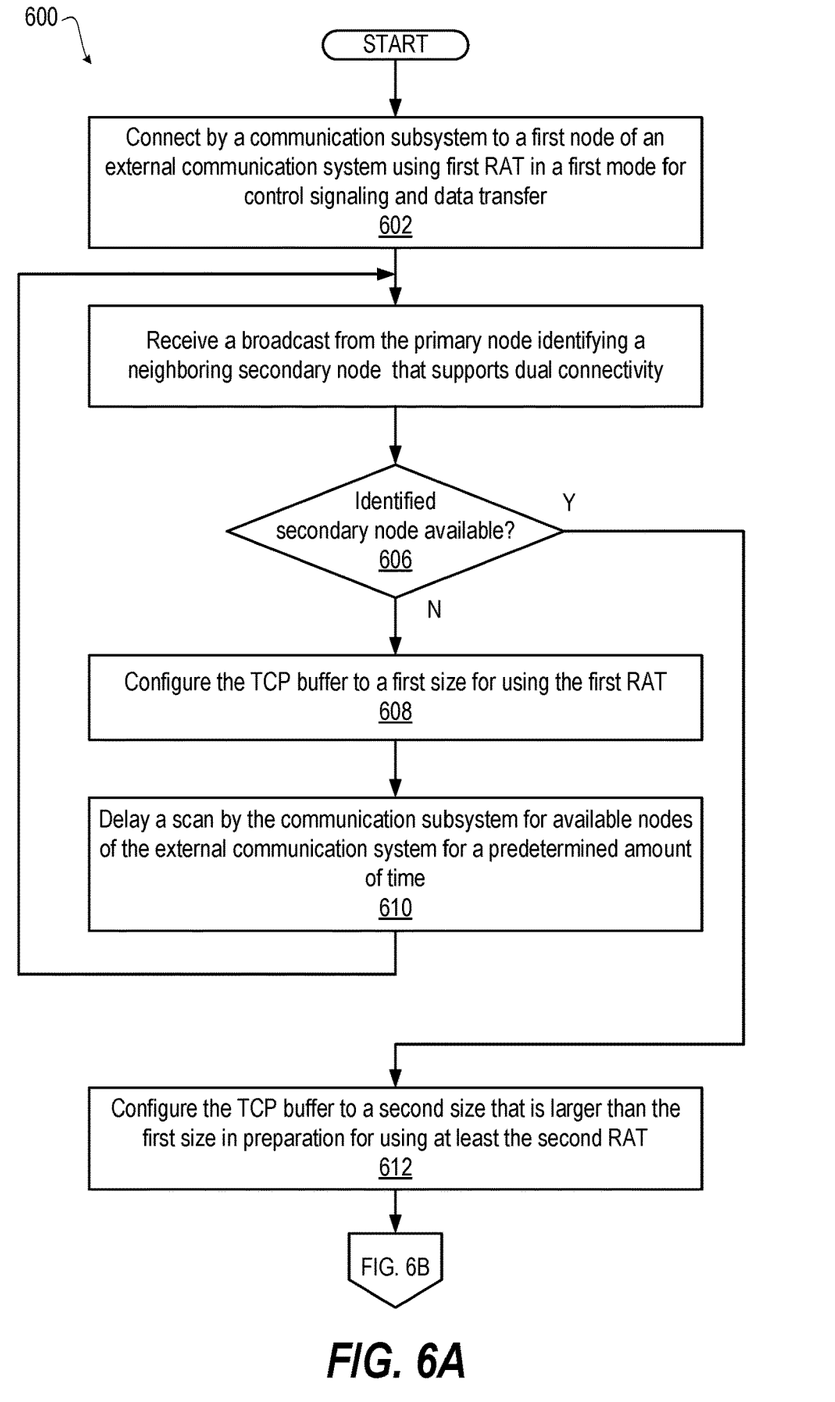
FIGS. 6A-6C (FIG. 6) present a flow diagram of a method for efficiently sizing TCP buffer(s) for more than one RAT, according to one or more embodiments.
Figure 6B:
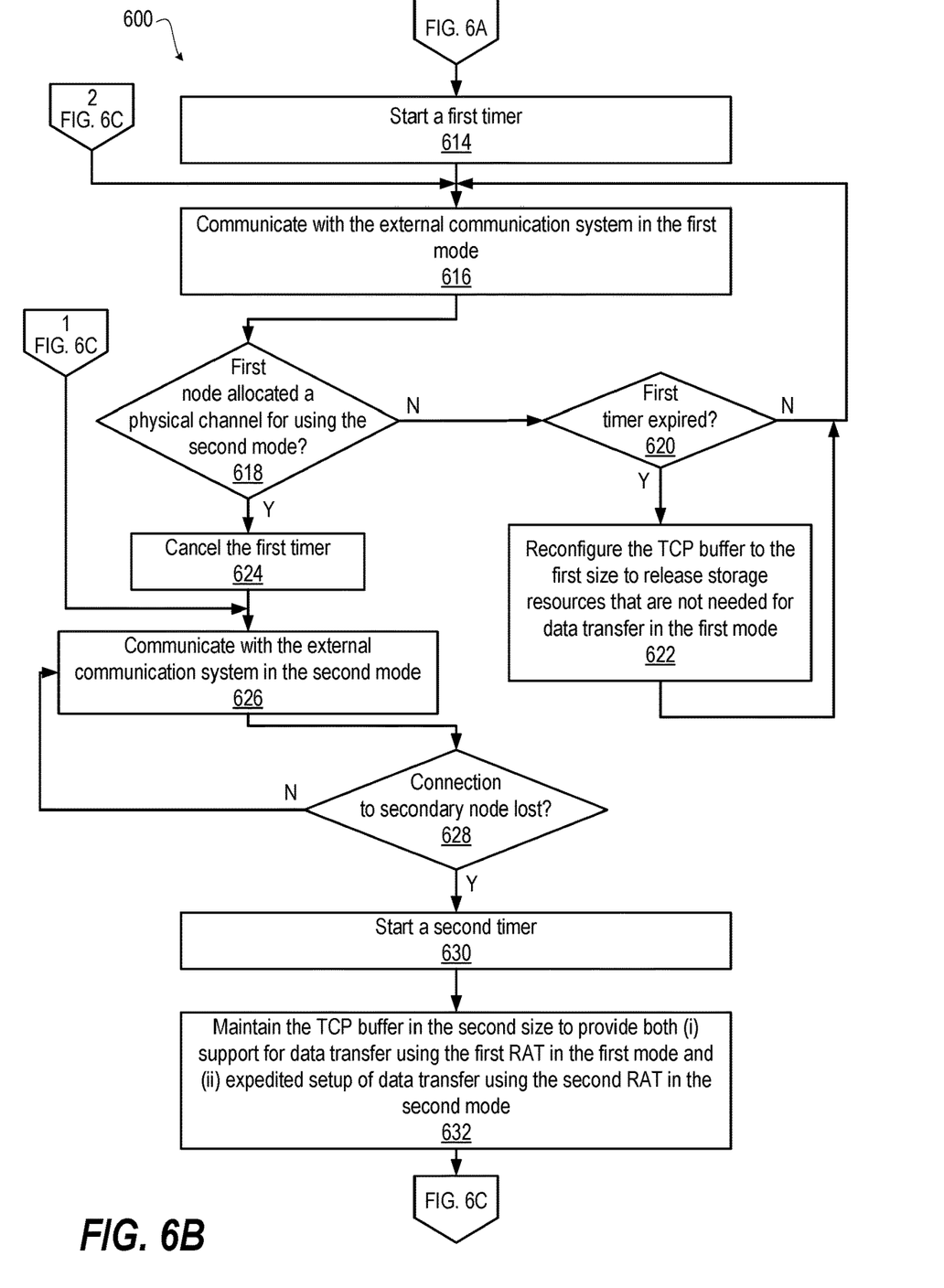
Figure 6C:
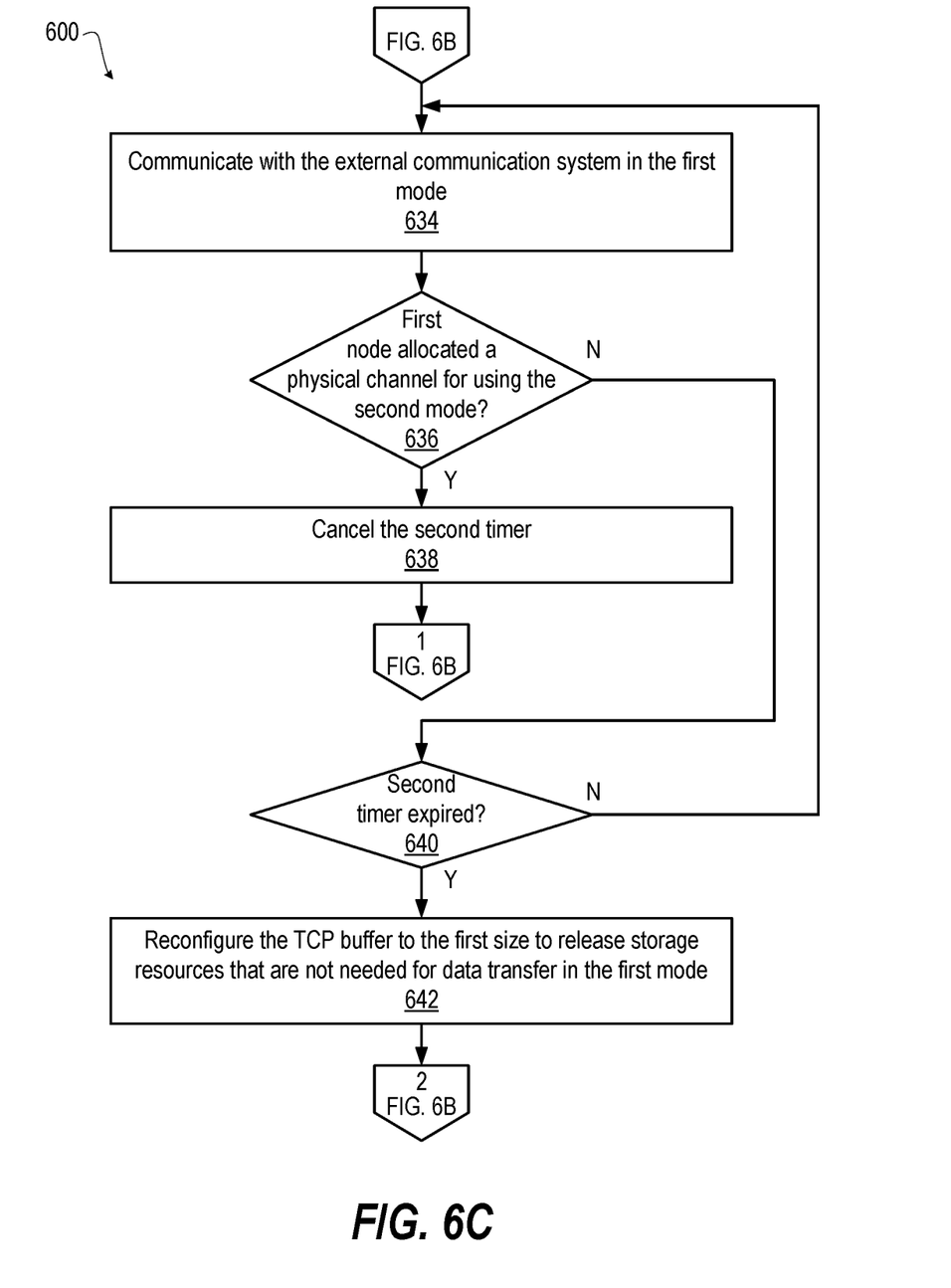

FIGS. 6A-6C (FIG. 6) present a flow diagram of method 600 for efficiently sizing TCP buffer(s) for changing connectivity using one or more RATs. The description of method 600 is provided with general reference to the specific components illustrated within the preceding FIGS. 1-5. In at least one embodiment, method 600 can be performed by communication subsystem 102 of communication device 100, managed by controller 101 (FIG. 1). With reference to FIG. 6A, method 600 includes connecting by communication subsystem 102 to a first node (eNB 124) (FIG. 1) of external communication system 122 using first RAT in a first mode for control signaling and data transfer (block 602). The first node is a master node. Method 600 includes receiving a broadcast from the primary node identifying any secondary node that supports dual connectivity (FIG. 604).

In one or more embodiments, the broadcast from the primary node includes a PLMN information list that indicates that a neighboring secondary node is available for ENDC operation, and the communication device automatically performs the additional steps to support the ENDC operations. In one or more embodiments, when the PLMN list indicates that the secondary node is available, the communication device scans for a broadcast from the identified neighboring secondary node to confirm availability before performing the additional steps to support the ENDC operations. A determination is made, in decision block 606, whether a secondary node is available for a second mode of dual connectivity using at least the first RAT for control signaling and using at least a second RAT for data transfer. In response to determining that the second node is not available for the second mode, method 600 includes configuring the TCP buffer to a first size for using the first RAT (block 608). Method 600 includes delaying a scan by the communication subsystem for available nodes of the external communication system for a predetermined amount of time (block 610). Then method 600 returns to block 604. In response to determining, at decision block 606, that the second RAT is available for the second mode, method 600 includes configuring the TCP buffer to a second size that is larger than the first size in preparation for using at least the second RAT (block 612). Method 600 continues in FIG. 6B.

With reference to FIG. 6B, method includes starting a first timer (block 614). Method 600 includes communicating with the external communication system in the first mode (block 616). A determination is made, at decision block 618, whether the first node has allocated a physical channel for using 5G NR in the second mode. In response to determining, in decision block 618, that the first node has not allocated the physical channel for using the second mode, method 600 includes determining, in decision block 620, whether the first timer has expired. In response to determining that the first timer has expired, method 600 includes reconfiguring the TCP buffer to the first size to release storage resources that are not needed for data transfer in the first mode (block 622). From block 622, method 600 returns to block 616. In response to determining that the first timer has not expired, method 600 returns to block 616. In response to determining in decision block 618 that the first node has allocated the physical channel for using the second mode, method 600 includes canceling the first timer (block 624). Method includes communicating with the external communication system in the second mode (block 626). A determination is made, in decision block 628, whether the connection to the secondary node is lost. In response to determining that the connection to the secondary node is not lost, method 600 returns to block 626. In response to determining that the connection to the secondary node is lost, method 600 includes starting a second timer (block 630). Method 600 includes maintaining the TCP buffer in the second size to provide both (i) support for data transfer using the first RAT in the first mode and (ii) expedited setup of data transfer using the second RAT in the second mode (block 632). Method 600 continues in FIG. 6C.

With reference to FIG. 6C, method includes communicating with the external communication system in the first mode (block 634). A determination is made, in decision block 636, whether the first node has allocated a physical channel for using the second mode. In response to determining that the first node has allocated the physical channel for using the second mode, method 600 includes canceling the second timer (block 638). Method 600 returns to block 626 (FIG. 6B). In response to determining that the first node has not allocated the physical channel for using the second mode, method 600 includes determining, in decision block 640, whether the second timer has expired. In response to determining that the second timer has expired, method 600 includes reconfiguring the TCP buffer to the first size to release storage resources that are not needed for data transfer in the first mode (block 642). From block 642, method 600 returns to block 616 (FIG. 6B). In response to determining that the second timer has not expired, method 600 returns to block 634.

In the above described flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
    a memory containing a transfer control protocol (TCP) buffer;
    a communication subsystem that connects to an external communication system for dual connectivity in one of: (i) a first mode using a first radio access technology (RAT) for control signaling and data transfer; and (ii) a second mode using the first RAT for control signaling and using at least a second RAT for data transfer, the first RAT requiring a first size of the TCP buffer and the second RAT requiring a second size of the TCP buffer that is different from the first size; and
    a controller communicatively coupled to the communication subsystem and the memory and which:
        in response to one of: (i) an initial connection, by the communication subsystem, to the external communication system; and (ii) and switching from the second mode to the first mode:
            communicates with the external communication system in the first mode;
            starts a timer;
            maintains the TCP buffer in the second size to provide both (i) support for data transfer using the first RAT in the first mode and (ii) expedited setup of data transfer using the second RAT in the second mode;
            in response to expiration of the timer, reconfigures the TCP buffer to the first size to release storage resources that are not needed for data transfer in the first mode; and
            cancel the timer in response to switching to the second mode.

2. The communication device of claim 1, wherein the second mode comprises aggregating data transfer using both the first and the second RAT.

3. The communication device of claim 1, wherein the controller:
    determines that a primary node providing communication service in the first mode supports dual connectivity with a neighboring secondary node that supports data transfer using the second RAT; and
    determines whether the neighboring secondary node is available for data transfer using the second RAT; and
    in response to determining that the adjacent secondary node is available:

configures the TCP buffer to the second size; and
starts the timer.

4. The communication device of claim 3, wherein the controller determines that the primary node supports dual connectivity with the neighboring secondary node based on receiving a broadcast from the primary node identifying the secondary node.

5. The communication device of claim 1, wherein the controller:
in response to the initial connection, by the communication subsystem, to the external communication system, starts the timer having a first duration; and
in response to switching from the second mode to the first mode, starts the timer having a second duration.

6. The communication device of claim 1, wherein the controller:
monitors a number of receive and transmit (Rx/Tx) packets awaiting data transfer by the communication sub system;
compares the number of Rx/Tx packets to a packet threshold;
in response to determining that the number of Rx/Tx packets is equal to or greater than the packet threshold, decrease a duration of the timer; and
in response to determining that the number of Rx/Tx packets is less than the packet threshold, increase a duration of the timer.

7. The communication device of claim 1, wherein the controller:
monitoring available memory space in the memory of the communication device;
comparing the available memory space to a space threshold;
increasing a duration of the timer in response to the available memory being equal to or greater than the space threshold; and
decreasing a duration of the timer in response to the available memory being less than the space threshold.

8. The communication device of claim 1, wherein the controller:
monitors availability of a connection to a node that supports use of the second RAT;
associates the availability of the connection to at least one of time and location of the communication device;
determines a pattern of availability of the connection;
compares at least one of the time and the location of the communication device to the pattern of availability to determine a likelihood of access to a node that supports use of the second RAT;
increases a duration of the timer in response to the likelihood of access being equal to or greater than an access threshold; and
decreases a duration of the timer in response to the likelihood of access being less than the access threshold.

9. The communication device of claim 1, further comprising a user interface device, wherein the controller is communicatively coupled to the user interface device and the controller:
monitors an activity status of the user interface device;
decreases a duration of the timer in response to the user interface device being active; and
increases a duration of the timer in response to the user interface device being inactive.

10. The communication device of claim 1, further comprising a proximity detection sensor, wherein the controller is communicatively coupled to the proximity detection sensor and the controller:
monitors user proximity to the communication device via the proximity detection sensor;
decreases a duration of the timer in response to user proximity being detected; and
increases a duration of the timer in response to user proximity not being detected.

11. A method comprising:
communicating, by a communication subsystem of a communication device, with an external communication system for dual connectivity in one of: (i) a first mode using a first radio access technology (RAT) for control signaling and data transfer; and (ii) a second mode using at least the first RAT for control signaling and using a second RAT for data transfer, the first RAT requiring a first size of a transfer control protocol (TCP) buffer and the second RAT requiring a second size of the TCP buffer that is different from the first size; and
in response to one of: (i) an initial connection to the external communication system; and (ii) and switching from the second mode to the first mode:
communicating with the external communication system in the first mode;
starting a timer;
maintaining the TCP buffer in the second size to provide both (i) support for data transfer using the first RAT in the first mode and (ii) expedited setup of data transfer using the second RAT in the second mode;
in response to expiration of the timer, reconfiguring the TCP buffer to the first size to release storage resources that are not needed for data transfer in the first mode; and
cancelling the timer in response to switching to the second mode.

12. The method of claim 11, further comprising:
receiving a broadcast from the primary node identifying availability of the secondary node for data transfer in the second mode;
determining that a primary node providing communication service in the first mode supports dual connectivity with a neighboring secondary node that supports data transfer based on the broadcast;
configuring the TCP buffer to the second size; and
starting the timer.

13. The method of claim 11, further comprising:
starting the timer having a first duration in response to the initial connection, by the communication subsystem, to the external communication system; and
starting the timer having a second duration in response to switching from the second mode to the first mode.

14. The method of claim 11, further comprising:
monitoring a number of receive and transmit (Rx/Tx) packets awaiting data transfer by the communication subsystem; and
comparing the number of Rx/Tx packets to a packet threshold;
in response to determining that the number of Rx/Tx packets is equal to or greater than the packet threshold, decrease a duration of the timer; and
in response to determining that the number of Rx/Tx packets is less than the packet threshold, increase a duration of the timer.

15. The method of claim 11, further comprising:
monitoring available memory space in the memory of the communication device;
comparing the available memory space to a space threshold;
increasing a duration of the timer in response to the available memory being equal to or greater than the space threshold; and
decreasing a duration of the timer in response to the available memory being less than the space threshold.

16. The method of claim 11, further comprising:
monitoring availability of a connection to a node that supports use of the second RAT;
associating the availability of the connection to at least one of time and location of the communication device;
determining a pattern of availability of the connection;
comparing at least one of the time and the location of the communication device to the pattern of availability to determine a likelihood of access to a node that supports use of the second RAT;
increasing a duration of the timer in response to the likelihood of access being equal to or greater than an access threshold; and
decreasing a duration of the timer in response to the likelihood of access being less than the access threshold.

17. The method of claim 11, further comprising:
monitoring an activity status of a user interface device of the communication device;
decreasing a duration of the timer in response to the user interface device being active; and
increasing a duration of the timer in response to the user interface device being inactive.

18. The method of claim 11, further comprising:
monitoring user proximity to the communication device via a proximity detection sensor;
decreasing a duration of the timer in response to user proximity being detected; and
increasing a duration of the timer in response to user proximity not being detected.

19. A computer program product comprising:
a computer readable storage device; and
program code on the computer readable storage device that when executed by a processor associated with a communication device including a communication subsystem configured for dual connectivity with an external communication system in one of: (i) a first mode using a first radio access technology (RAT) for control signaling and data transfer; and (ii) a second mode using the first RAT for control signaling and using at least a second RAT for data transfer, the first RAT requiring a first size of a transfer control protocol (TCP) buffer and the second RAT requiring a second size of the TCP buffer that is different from the first size, the program code enables the communication device to provide functionality of:
in response to one of: (i) an initial connection to the external communication system; and (ii) and switching from the second mode to the first mode:
communicating with the external communication system in the first mode;
starting a timer;
maintaining the TCP buffer in the second size to provide both (i) support for data transfer using the first RAT in the first mode and (ii) expedited setup of data transfer using the second RAT in the second mode;
in response to expiration of the timer, reconfiguring the TCP buffer to the first size to release storage resources that are not needed for data transfer in the first mode; and
cancelling the timer in response to switching to the second mode.

20. The computer program product of claim 19, wherein the program code enables the communication device to provide the functionality of:
receiving a broadcast from the primary node identifying availability of the secondary node for data transfer in the second mode;
determining that a primary node providing communication service in the first mode supports dual connectivity with a neighboring secondary node that supports data transfer based on the broadcast;
configuring the TCP buffer to the second size; and
starting the timer.

* * * * *